(12) United States Patent
Berger et al.

(10) Patent No.: US 6,705,244 B1
(45) Date of Patent: Mar. 16, 2004

(54) STRAP AND METHOD FOR PRODUCING SAME

(75) Inventors: Johann Berger, Obere Schloss-strasse 114, D-73553 Aldorf (DE); Josef Märtz, Eching (DE)

(73) Assignee: Johann Berger (DE)

( * ) Notice: Subject to any disclaimer, the term of this patent is extended or adjusted under 35 U.S.C. 154(b) by 0 days.

(21) Appl. No.: 09/857,888

(22) PCT Filed: Dec. 14, 1999

(86) PCT No.: PCT/EP99/09937

§ 371 (c)(1),
(2), (4) Date: Jun. 13, 2001

(87) PCT Pub. No.: WO00/36197

PCT Pub. Date: Jun. 22, 2000

(30) Foreign Application Priority Data

Dec. 14, 1998 (DE) .......................... 198 57 517
Mar. 17, 1999 (DE) .......................... 199 11 972

(51) Int. Cl.⁷ .................... D05B 97/00; B60R 22/28; D03D 1/02
(52) U.S. Cl. .................... 112/475.06; 139/389; 280/733
(58) Field of Search .............. 112/475.06, 475.01, 112/475.08; 280/733, 743.1, 801.1, 728.1; 139/389

(56) References Cited

U.S. PATENT DOCUMENTS

| 3,682,498 | A |   | 8/1972  | Rutzki           |
|-----------|---|---|---------|------------------|
| 3,866,940 | A | * | 2/1975  | Lewis ........... 280/733 |
| 3,888,503 | A |   | 6/1975  | Hamilton         |
| 6,007,092 | A |   | 12/1999 | Martz            |
| 6,419,263 | B1| * | 7/2002  | Busgen et al. ... 280/733 |
| 6,439,601 | B1| * | 8/2002  | Iseki ............ 280/733 |

FOREIGN PATENT DOCUMENTS

DE 2008048 9/1971
DE 198 04 378 8/1999

* cited by examiner

*Primary Examiner*—Peter Nerbun
(74) *Attorney, Agent, or Firm*—Banner & Witcoff, Ltd.

(57) ABSTRACT

A method of fabricating an inflatable seat webbing, more particularly for a seat belt, comprising the steps of weaving a two-ply fabric having an upper ply and a lower ply, folding and placing outermost outer parts on adjoining parts so that all parts are located in sequence above or below a middle part to result in, as viewed in a warp direction, the configuration of a collapsed concertina, and tucking the middle part to the left as viewed from a predetermined direction in relation to fabric threads so that the upper ply and the lower ply of the middle part formerly facing each other now face outwards and sandwiching the folded outer parts and the middle part in between.

10 Claims, 9 Drawing Sheets

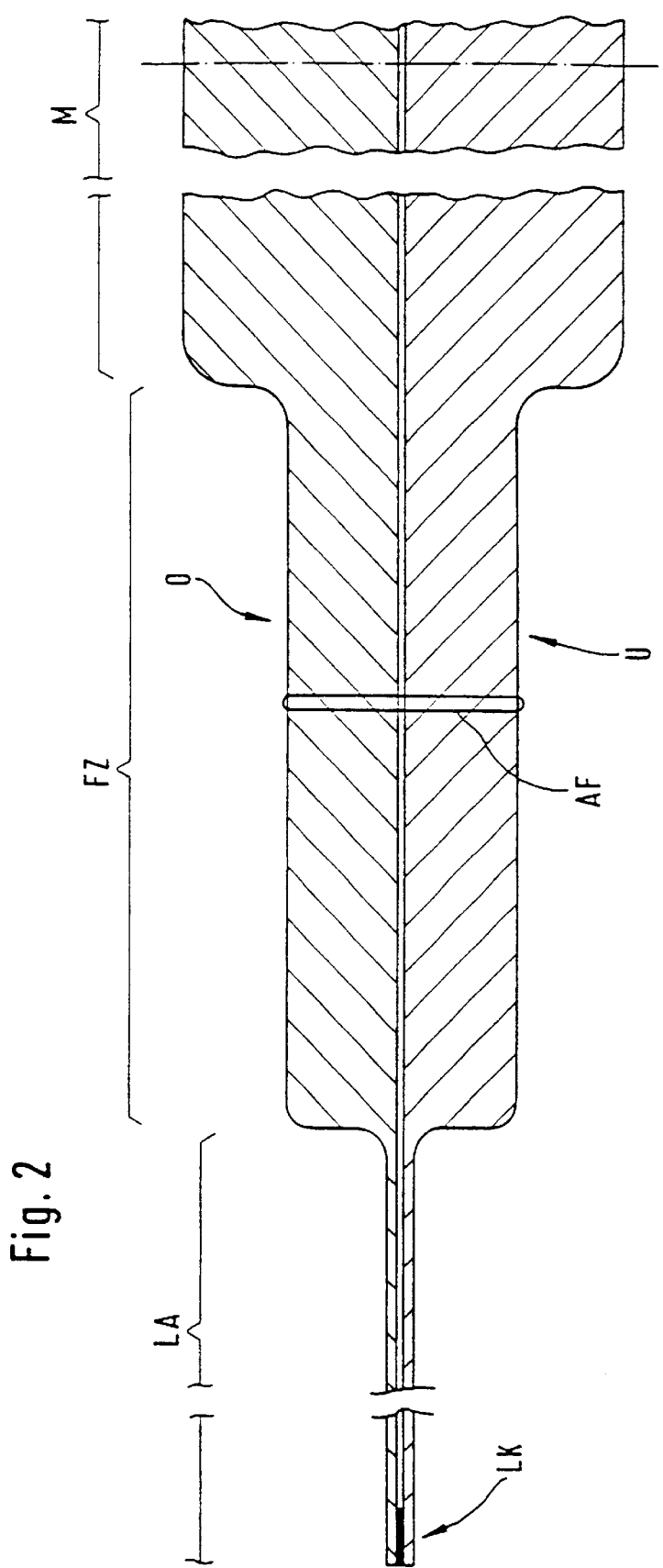

STRAP AND METHOD FOR PRODUCING SAME

The invention relates to a method of fabricating a woven, inflatable webbing, more particularly an automotive seat belt webbing.

Known from German Patent 20 08 048 (Rutzki) is a webbing configured tubular and comprising a portionally stitched burst fold designed to burst open due to the tensional forces exerted by the belt in a collision whilst activating opening of a valve connected thereto to inflate the tubular belt portionally, as a result of which the belt located as a flat tube prior to the accident, the width of which corresponds to half the circumference of the inflated belt, is explodingly inflated portionally. It thus represents an "impact cushion" of advantage to a certain extent as compared to the straight-forward belt. However, adequate protection of the vehicle occupant fails to be satisfactorily assured due to the insignificant extent of the portionally inflated tubular belt. Increasing the circumference of the belt tube cited likewise in the same document with an inflatable cushion, arranged portionally about the belt also has its disadvantages since the corresponding cushion is not necessarily correctly located in an emergency situation and thus actually fails to be available for its intended purpose.

Known from the international patent application PCT/US95/10695 (Simula) is a inflatable, tubular restraint system. The seat belt system evident therefrom consists of a lap belt and a shoulder belt, the lap belt consisting portionally of an inflated balloon which during inflation is shortened in length to thus have a belt tensioning function in addition to its impact cushioning function. Although in this arrangement the abdominal zone of the vehicle occupant is particularly protected, no protection is given to the shoulder and head zone, however, except for an additional restraint of the shoulders by the tensioned belt.

The object of the invention is to provide a belt or webbing as well as a method of fabricating same having practically no limitations, i.e. in assuring optimum impact protection irrespective of the actual location in an accident situation and permitting cost-effective and reliable fabrication of the webbing respectively.

This object is achieved by a method as it reads from claim 1 and/or a method as it reads from claim 2 and a webbing as set forth in claim 5.

The method in accordance with the invention for fabricating a webbing comprises (in short) the following steps, weaving a two-ply (upper or first ply, lower or second ply) three or more part (at least one left outer part, middle part, at least one right outer pan) fabric, concertina folding and placement of more than two outer parts, form each outermost outer part to each innermost outer part until the no more than two outer parts are located on the outer parts adjoining note middle part, folding the one outer part adjoining the middle part along the one crease onto an outer surface of the middle part facing away from the second ply, folding the other outer part along the other crease onto the other outer surface of the middle part facing away from the firs ply so that—as viewed in the warp direction—the configuration of a collapsed concertina materializes and tucking the middle part "to the left" so that the one and other surface of the middle part formally facing away from each other now face each other and sandwich the folded outer parts.

With a webbing fabricated in this way any webbing/air bag configuration is optionally achievable to advantage. Depending on the selected number of outer parts an air bag volume achievable by the air bag belt being inflated as prompted by the collision materializes differing in size, thus permitting adaptation to all differences in vehicle type, seating configuration, occupant stature, body weight to be cushioned, etc. Another advantage is that by additionally nip seaming the outer parts individually from the edges—outermost in the woven condition—inwards to the middle part a belt bag volume is attainable which is uneven in the longitudinal direction of the webbing (FIGS. 6 to 8 and 10). As a result of this it is now possible to save having to provide the side air bag usually accommodated in the door cladding and the head bag usually accommodated in the roof ledge above the doors. The vehicle occupant is safeguarded by a sole air bag integrated in the seat belt, i.e. by a belt bag in lap, flank, chest and head zone and protected from injury by impacting vehicle parts, irrespective of his posture, i.e. whether relaxed, slumped or sitting upright. One particular advantage of the method in accordance with the invention and thus of the webbing fabricated thereby is in it saving several expensive air bag systems (at least one door air bag and 1 side/head air bag per vehicle occupant). Nip seaming as mentioned above is not restricted to actual stitching, i.e. seaming, this instead intended to mean all measures undertaken suitable for individually locally joining the top with the bottom fabric ply such as weaving, bonding, welding and the like. It is particularly of advantage and cost-saving to fabricate the nip seam(s) by selectively weaving the top to the bottom fabric ply on a Jacquard weaving machine.

The method in accordance with the invention for fabricating a webbing comprises (in short) the following steps: weaving a two-ply (upper ply, lower ply) three-part (left outer part, middle part, right outer pant) fabric, folding the one outer part along a crease onto the surface of the middle part, folding the other outer part along the other crease onto the other surface of the middle part so that—as viewed in the warp direction—the configuration of a collapsed Z materializes and tucking the middle part "to the left" so that the one and other surface of the middle pant formerly facing away from each other now face each other and sandwich the folded outer parts.

Weaving may be implemented on a Jacquard wide web weaving machine or a needle web weaving machine. Folding the outer parts is done on simple means suitable for this purpose which are not described further. Tucking the middle part "to the left" is done by introducing a rod or the like tipped with a gripper into a matched length of webbing between the two middle part plies until the gripper reappears at the other open end of the webbing and clamps in the gripper the middle parts folded inwards together with the outer parts folded thereon and then withdrawing the rod together with the gripper contrary to the direction inserted from the interior of the middle part with a suitable counterhold. Once the rod with the gripper is fully withdrawn a fully "left-hand" tucked webbing is available in which the outer parts are sandwiched between fabric plies of the middle part. The method in accordance with the invention is thus an advantage because it is so simple and produces smooth webbings.

The weft thread of the webbing in accordance with the invention may be a sole multifil or a multifil with a monofil. Employing monofil as the weft thread results in a stiffer, more elastic webbing. Logos and the like may be, of course, included in the weave of the webbing in accordance with the invention by suitable setting the shanks and shank control, there being no limits to that desired by the user in this respect.

One advantageous further embodiment of the method in accordance with the invention reads from claim 2, it being here in particularly that the warp threads in the region of the narrow creases have a dtex roughly half that of the warp threads of the middle part. If, for example, the warp threads of the middle part are dtex 1100, then the warp threads of the narrow creases are dtex 550. This brings the advantage that in the folded condition in which, as viewed in all, the material of the creases is present in four plies, as compared to the double ply of the middle part, a more or less equal thickness of the folded webbing results over the full width since the warp threads in the creases are roughly half as thick as the warp threads in the middle part.

In a further advantageous aspect of the invention the two fabric plies in the middle portion of the middle part are joined to at least two burst threads running substantially in the warp direction.

In another advantageous aspect of the invention the fabric of the webbing is provided with a coating prior to folding. The coating results in a significant reduction in the permeability of the fabric and enables the internal pressure of an inflated webbing to be maintained over a longer period in time. This is particularly decisive when the vehicle is not abruptly halted by a collision, it instead toppling or continuing its travel so that the vehicle occupant needs to be safely restrained in the vehicle seat correspondingly longer.

Advantageous further embodiments and features of the invention read from the sub-claims.

The invention will now be detailled with reference to the attached drawings to which reference is made and in which:

FIG. 2 is a section through the detail X as shown in FIG. 1 on a magnified scale.

Figure 1:
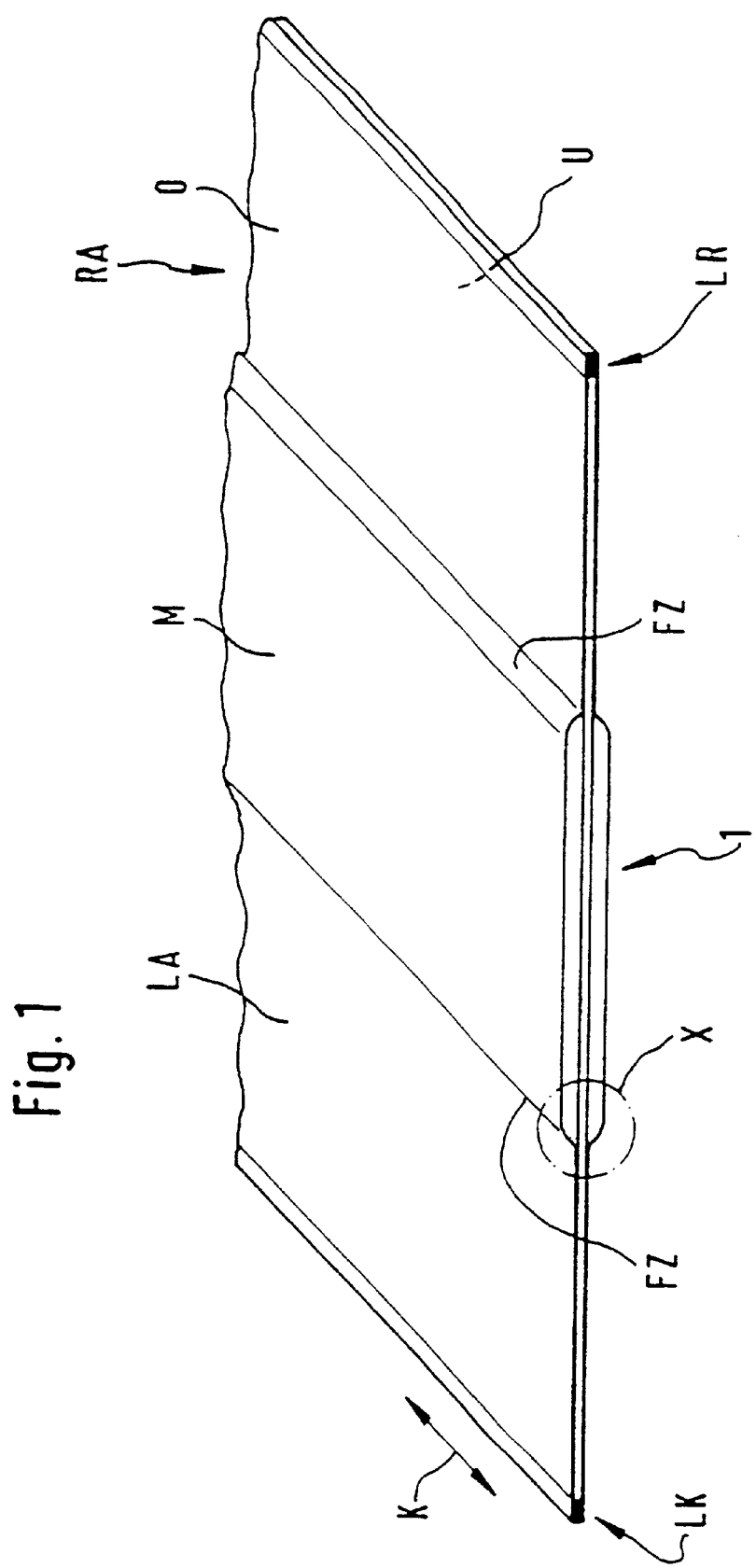
FIG. 1 is a schematic viewed in perspective of a webbing in accordance with the invention after the "weaving" step in the method.

Referring now to FIG. 1 there is illustrated a webbing 1 after weaving with the two fabric plies "upper ply" O and "lower ply" U each divided in turn into three roughly equal parts "left outer part" LA, "middle part" M and "right outer part" RA. The thickness of each warp thread running in the direction of the arrow K and the individual warp threads are indicated only schematically to simplify the illustration. It is evident in the middle part M that the warp threads are substantially thicker than the warp threads in the outer parts LA and RA. On the left-hand side of the left outer part the upper fabric ply O and the lower fabric ply U are interwoven. This portion is identified by the reference letters LK. Located opposite thereto there is an edge LR along which the right outer parts RA of the upper fabric ply O and of the lower fabric ply U are interwoven. In the transition portion from the middle part M to the outer parts RA and LA creases FZ are evident in which the warp threads are finer than in the middle part M and coarser than in the outer parts LA and RA. The detail X is illustrated magnified in FIG. 2 and further described. The webbing is leaving the loom as shown in FIG. 1.

Referring now to FIG. 2 there is illustrated schematically the detail X taken from FIG, 1, here greatly magnified, to show the differences in the thickness of the warp threads. Evident on the left-hand side is the left edge LK along which the upper fabric ply O and the lower fabric ply U are interwoven. Evident in sequence from the left outer side of the woven webbing up to the centerline showed on the right hand side in FIG. 2 are the following portions of the webbing: on tile left-hand side is the left outer part LA adjoining the left crease FZ which in turn it traslates into the middle part M. In this example embodiment it is not the individual warps that are shown but in their thickness through the webbing thickness illustrated as a strip. The differing warp thread diameters are clearly evident from the example embodiment as shown in FIG. 2. Thus, for example, the diameter of the warp threads in the left outer part is roughly a tenth of that of the warp thread in the middle part. In the crease FZ the diameter of the warp thread is roughly half mat of the warp threads in the region of the middle part M. The advantages or differing functional assignments of these differences in the warp threads are evident in detail from the description of FIG. 4. Roughly in the middle of the crease FZ, but possibly shifted also somewhat nearer to the middle part M, is indicated the position of a burst thread AF illustrated schematically interconnecting the upper fabric ply O and the lower fabric ply U and designed to burst at a predetermined rupture load so that the individual fabric plies move in the direction of the explosion arrows E (FIG. 4) and opening the webbing into an inflated belt ba& For the application in which the material of the outer parts LA and RA is selected thicker, the position of the burst threads AF (FIG. 4) may also be displaced somewhat inwards to accommodate the heavier coverage In this case, namely, the upper and the lower fabric ply may slightly depart from each other since the fabric is able to yield slightly in the creases (upwards and downwards in FIG. 4).

Figure 3A:
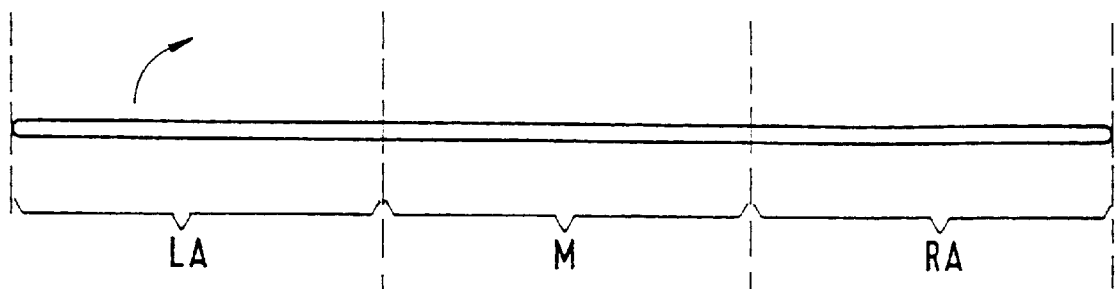
FIGS. 3a to 3c is a strongly schematic view of the webbing in accordance with the invention as shown in FIG. 2 illustrated before, during and after folding the outer parts.
Figure 3B:
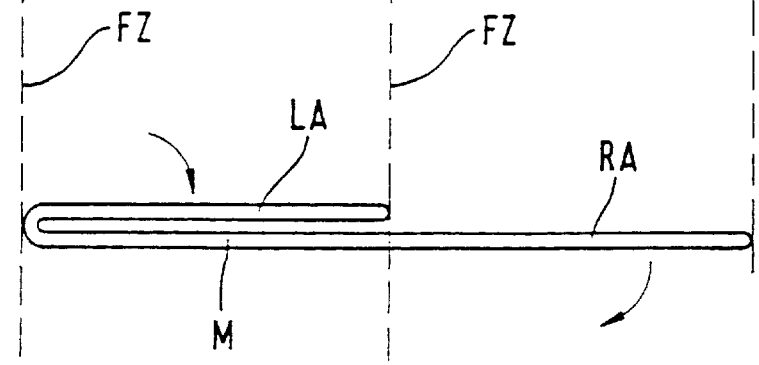
Figure 3C:
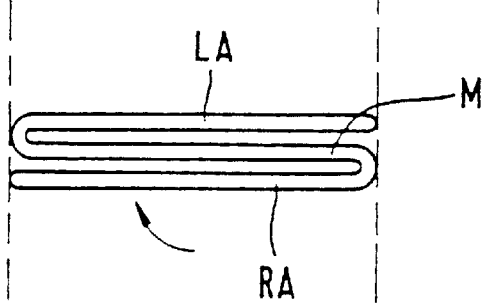

Referring now to FIGS. 3a to 3c there is illustrated schematically how the outer parts are folded onto the middle part. To simplify the illustration the differences in the diameter of the warp threads are not taken into account, i.e. in the FIGS. 3a to 3c all of the warp threads are depicted schematically with the same diameter. FIG. 3a shows the fabric parts LA, M and RA still to be folded. In FIG. 3b the left outer part LA has been folded onto the middle part M in the middle. At the same time FIG. 3b shows on the right-hand side the direction arrow indicating the folding direction of the right outer part RA. In this illustration the reference letters FZ indicate the location of the creases FZ. FIG. 3c shows the webbing after the outer parts have been folded. Otherwise it is irrelevant whether the left outer part LA is located at the top and the right outer part RA on the bottom of the middle part, it being just as possible to make the folds in the reverse direction. The folding configuration as shown in FIG. 3c results in an S-shape in principle. The reverse folding direction would produce a Z shape, there being, as said, no difference in this respect. The magnified illustration as shown in FIG. 4 relates in this respect to a folding direction producing a Z-shaped configuration.

Figure 4:
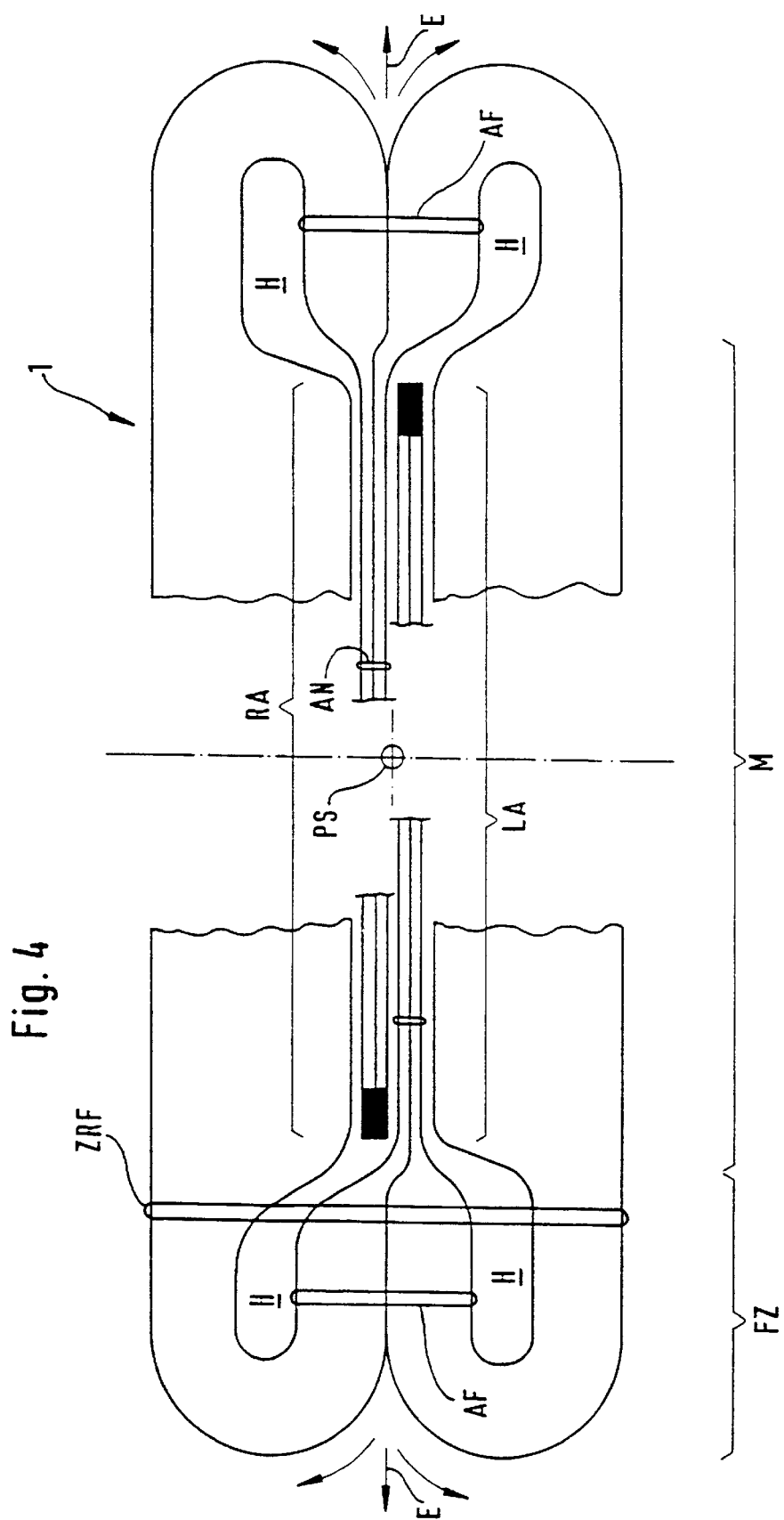
FIG. 4 is a schematic view of the webbing in accordance with the invention shown greatly magnified as shown in FIGS. 3a to 3c after the "tucking" step in the method.

Referring now to FIG. 4 there is illustrated schematically the actual differences in diameter of the warp threads greatly magnified. It is in this simplified schematic illustration that the webbing in accordance with the invention is evident after having been tucked "to the left". Again evident is the middle part M illustrated discontinued in the middle, as well as the left-hand crease FZ. Since the webbing 1 in accordance with the invention is configured symmetrically about the centerline or point PS FIG. 4 is identified by reference letters substantially on one side only. It is obvious, of course, that illustrating the actual configuration of the tucked webbing is not possible in FIG. 4, because the cavities H shown therein to be seen for example in the region of the burst thread or in the inverse positions are not present in reality, since namely after being tucked the webbing is ironed or flattened and fixed in some other way. This results in each material "seeking" an available space so that an optimally dense package is achieved. Depicting this in the illustration is, for one thing, extremely difficult and, for another, it would hardly furnish any still useful information.

Evident on the left-hand side of FIG. 4 is an additional burst thread ZRF which joins the folded fabric plies to each other in the crease FZ. This version could be put to use when wishing to avoid any "bloating" of an inlaid voluminous inlet with the intention of obtaining a more compact webbing.

Figure 5:
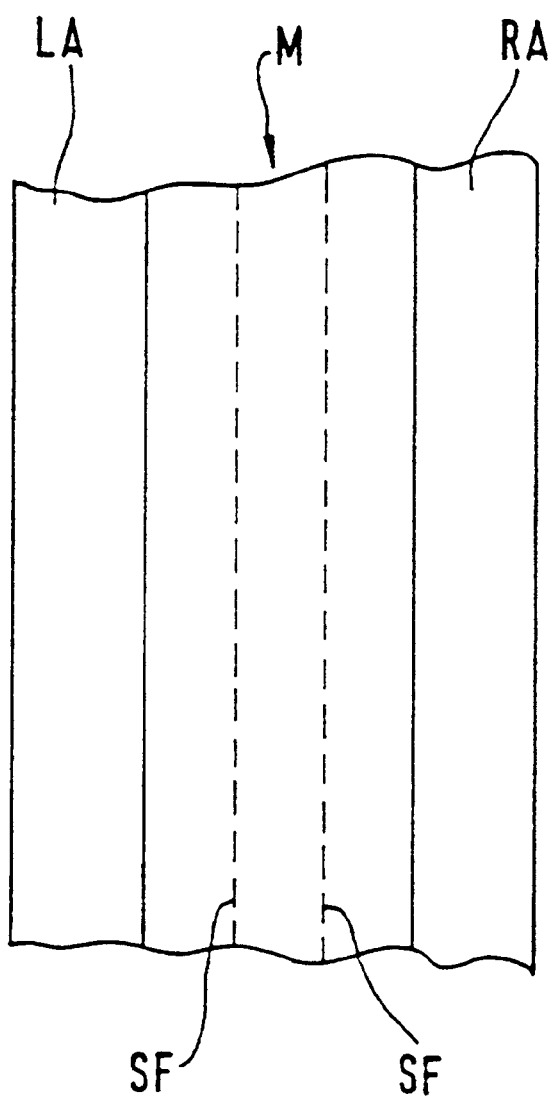
FIG. 5 is a schematic view as seen from above of a section of the webbing in accordance with the invention (as shown in FIG. 1).

Referring now to FIG. 5 there is illustrated schematically a section of a webbing in accordance with the invention as seen from above. Indicated in the middle part of the webbing are two broken lines SF defining the position of optimum nip seams for the supply gas hose. These nip seams may be stitched in place along the webbing when tucked by means of a sewing machine. The so-called supply gas hose is inserted between the two nip seams for supplying the webbing with explosion gas when explosion is called for.

Figure 6:
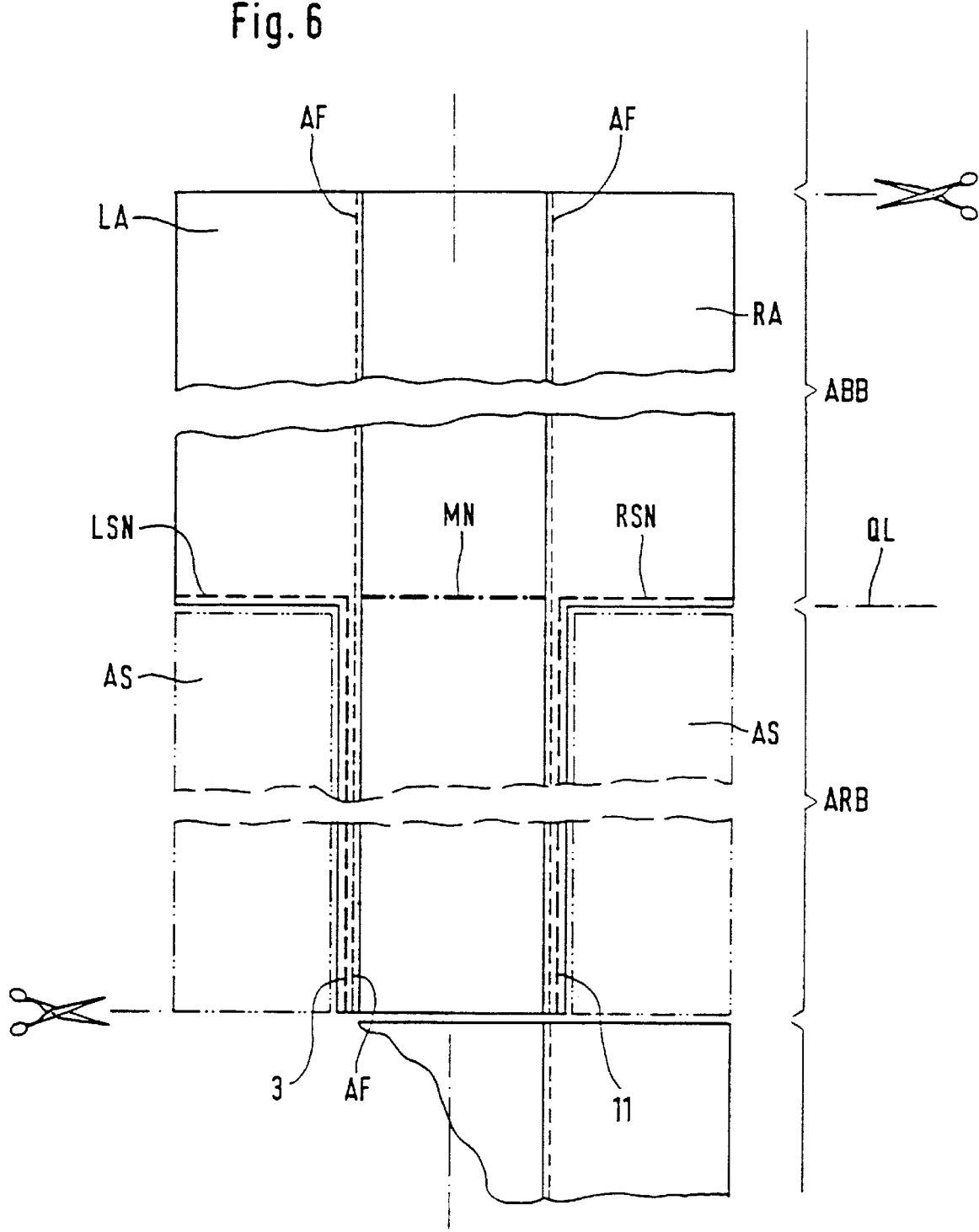
FIG. 6 is a further embodiment of the webbing fabricated by the method.

Referring now to FIG. 6 there is illustrated an example embodiment of the invention fabricated by the method as it reads from claim 10. This drawing is strongly schematic to simplify the illustration, it showing not the final product but various stages in the method and their special features. Thus, in this case what is shown in principle is a seat belt prepared for being assembled into a seat belt module. The salient feature of this seat belt is that it has a portion in which it is inflatable (ABB) and a portion in which it is intended for being rolled up in a retractor (ARB). As a result, the seat belt is thinner in the retraction portion ARB than in the inflation portion ABB. Shown in the upper part of FIG. 6 is the inflation portion ABB shown in earlier example embodiments of the webbing in accordance with the invention with the middle part M and the outer parts LA and RA as well as the burst seam AF running in the creases as known from the above description. When a predetermined length is cut off from an endless webbing woven in this kind the retraction portions ARB and inflation portion ABB abutting each other at a line QL are defined. After this, the transverse seams LSN and RSN are applied to the outer parts of the webbing in line with QL by means of a sewing means. These seams are sealing seams and close off the web plies of the outer parts sealingly. Before or after applying the transverse seams LSN and RSN the longitudinal seams 3 and 11 are applied which extend along the retraction portion ARB. In both the left-hand and right-hand outer part together with the outer edges of the webbing and the edges marked previously with the scissor lines the seams LSN, RSN, 3 and 11 surround portions AS, each of which is depicted schematically by a double dot/dash line. When these portions AS are cut out, the remaining outer parts LA and RA, as already described before for other example embodiments, especially with reference to the FIGS. 3a, 3b and 3c, are folded in Z-shape and the complete webbing tucked to the left in accordance with the step in the method "tucking the middle part". This results in a portion in which with the air bag fabric tucked inwards produces the inflation portion whilst the webbing tucked into the retraction portion ARB contains no bag fabric as such. Then, the middle part M of the webbing is sealed gas-tight along the line QL by a middle seam MN, thus resulting in a webbing ready for assembly in module production.

Figure 7:
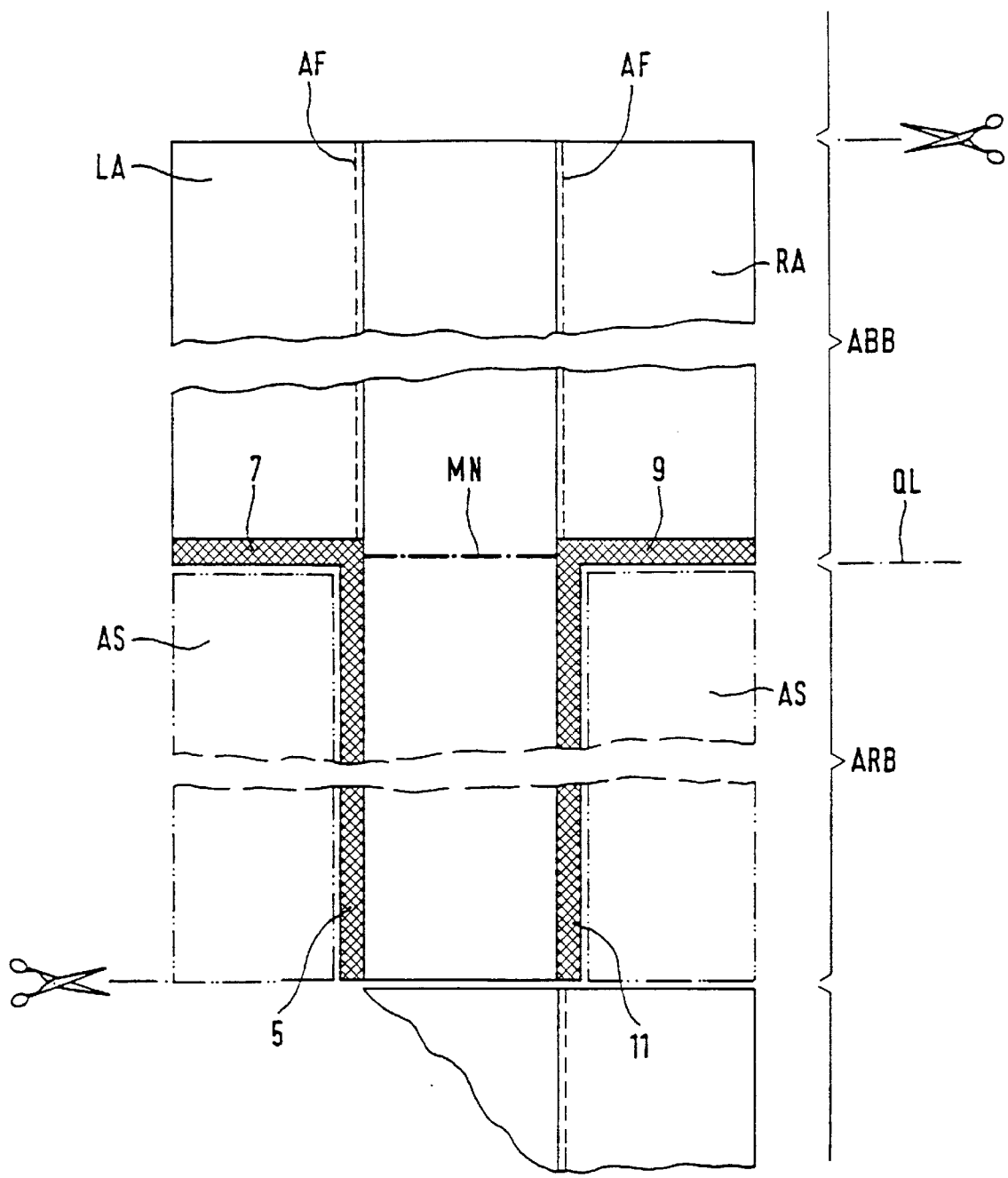
FIG. 7 is a further embodiment of the webbing fabricated by the method.

Referring now to FIG. 7 there is illustrated an embodiment of a webbing in accordance with the invention substantially the same as the version shown in FIG. 6 except that, as the main difference, there after weaving no seams are placed to join the upper and lower woven ply of the outer parts. Instead, joining the upper and lower woven ply in this portion is created along a transverse line QL already during weaving, namely by the upper ply and the lower ply of the outer parts LA and RA of the webbing being interwoven in a strip by means of transverse seams 7 and 9 running in the weft direction, thus resulting in a positive connection of the upper and lower woven ply already during weaving. The same interweave is also intended along the creases in the retraction portion so that a firm connection of the upper and lower woven ply is produced during weaving in the strips 5 and 11 along the creases. These joining portions of the upper and lower woven ply indicated symbolically by cross-hatching replace the longitudinal and transverse seams applied in the example embodiment as shown in FIG. 6. The further handling of the webbing up to its condition ready for assembling in the module is the same as described relative to the FIG. 6 to which reference is accordingly made. In the example embodiments as shown in FIGS. 6 and 7 no burst seam AF is needed in the portion ARB.

Figure 8:
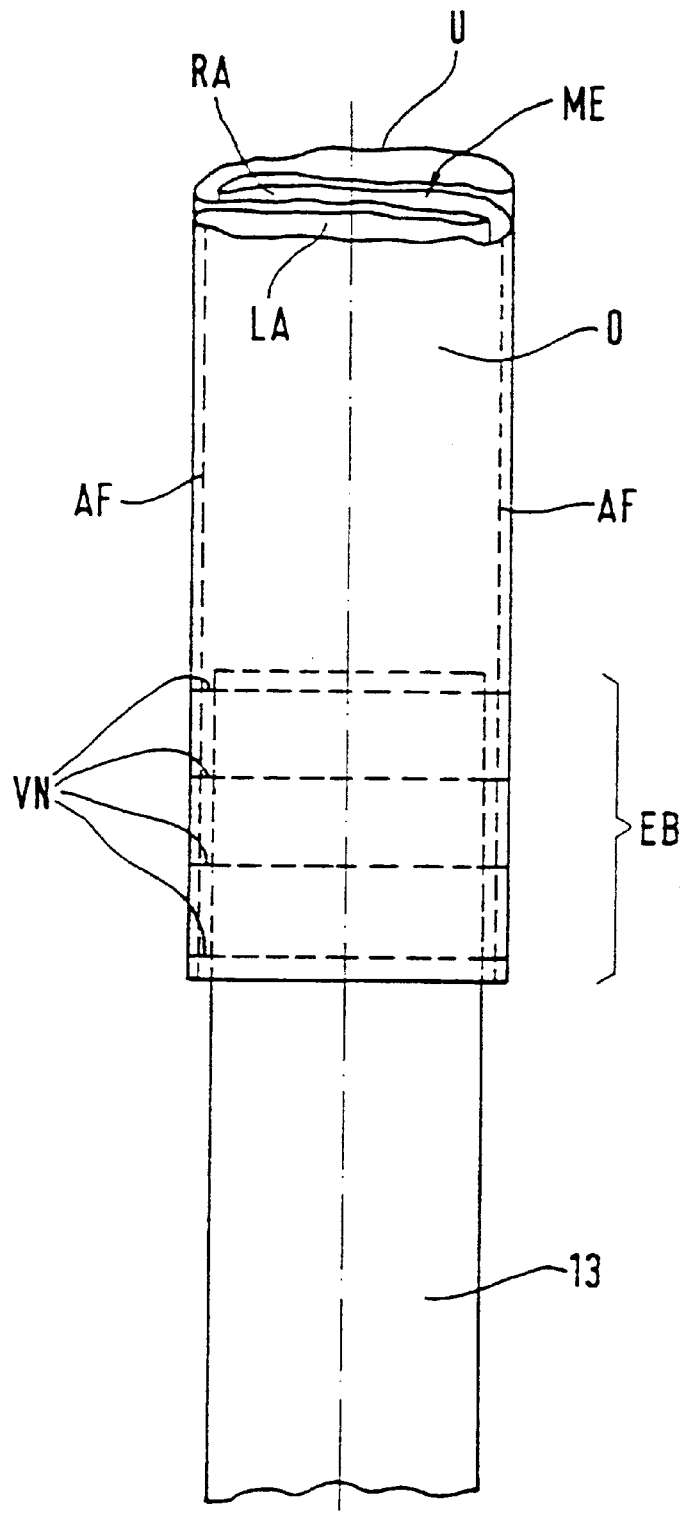
FIG. 8 is a further embodiment of the webbing fabricated by the method.

Referring now to FIG. 8 there is illustrated schematically an example embodiment of a webbing produced by the method. Evident in the upper part of FIG. 8 is a webbing in accordance with the invention already tucked so that the outer parts LA and RA are located inwards. A webbing 13 is inserted (in FIG. 8 from below) into the interior of the tucked webbing, i.e. into the middle plane indicated by an arrow ME between the tucked-in outer parts LA and RA over a length ES intended to designate the length of an end portion of the inserted webbing 13. For the sake of simplicity the differing thicknesses in the fabric are not indicated by differing line thicknesses, a uniform line thickness being used throughout. However, from the description relative to the FIGS. 2 and 4 in particular, it is obvious that significant differences in fabric thicknesses exists After having sandwiched the single-ply a webbing 13 between the two plies of the two-ply fabric there are stitched by one or more seams VN, spaced away from each other sufficiently so that the overlapping portion ESB of the plies remaining floppy. It will readily be appreciated that the four transverse seams VN in the example embodiment as shown in FIG. 8 do not detriment of floppiness of the transition portion RB of the webbing. The number of four seams VN selected in this case and also the end portion EB or its length are selected merely as an example. Depending on the user specification the end portion or it length/width ratio maybe other the that as shown in FIG. 8. The number of transverse seams VN and their spacing from each other may also be varied depending on the requirements of the module manufacturer.

For assembling the webbings having the various portions as just described they are installed in the retraction portion ARB oriented towards the retractor whilst the other end with the inflation portion ABB is joined to a gas supply. Details of this are known from prior art and thus do not need to be described in the present specification.

Figure 9:
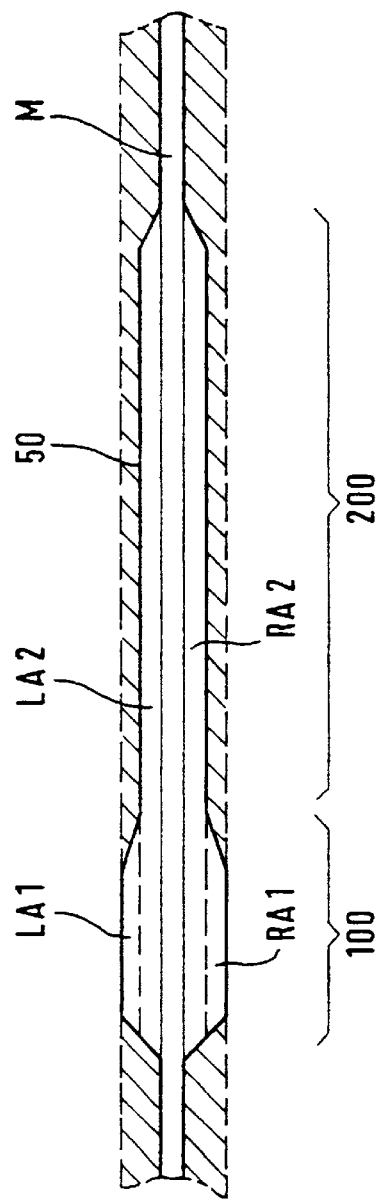
FIG. 9 is a schematic illustration of a matched woven webbing including two outer parts each and a middle part.
Figure 10:
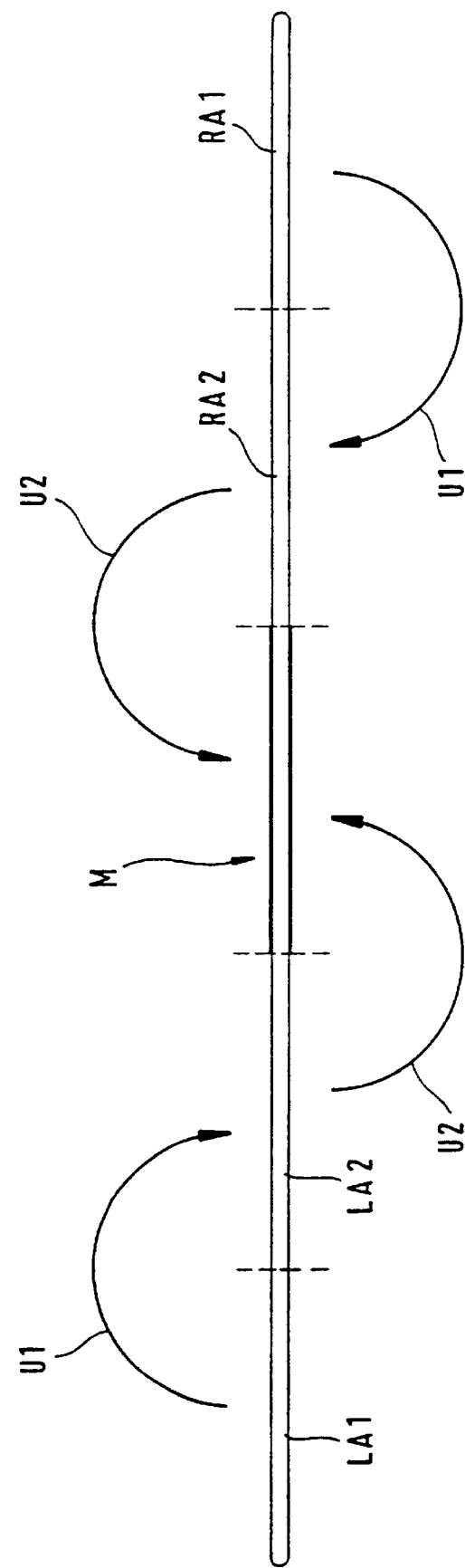
FIG. 10 is a schematic illustration of how the outer parts are folded in sequence up to finally on the middle part.

Referring now to FIG. 9 there is illustrated an adapted woven webbing having a middle part M, right outer parts RA1, RA2 and left outer parts LA1, LA2 which as shown in FIG. 10 depicting a woven two-ply webbing (strongly schematic) in cross-section, is folded in the sequence of the arrows U1, U2 so that in the end they are located on the top or bottom side of the middle part M. The further steps in the method are the same as those as already described for the example embodiments above.

Indicated by the broken line in FIG. 9 is the outer contour of the webbing furnished by the weaving machine. The thick enveloping line 50 in the region of the outer parts marks the nip seams as described above. The shaded portion between the outer contour and line 50 is cut out, details of which are analog to that as shown in FIG. 6. In principle, all configurations of the "cut-out" belt bag webbing width are possible, e.g. for a large volume in the head portion, "near zero" volume in the region of the buckle, etc. Each version is harmonized to customer requirements.

The left-hand end of the webbing as shown in FIG. 9 comprises a portion 100 which is inflated when required in the region of the head of the vehicle occupant whilst the right-hand end contains a portion 200 smaller in cross-section as compared to that of the portion 100 which is located and inflated in the region of the chest and lap of the vehicle occupant.

Referring now to FIG. 10 there is illustrated a webbing divided into the following five sections: LA1, LA2, M, RA2 and RA1. The sections LA1 and RA1 are folded clockwise as shown by the arrows U1 through roughly 180·(in FIG. 10) and located on the sections LA2 and RA2 respectively. Each of the "packages" LA1/LA2 and RA1/RA2 is then folded onto the middle part, thus resulting in the individual sections being concertina folded. Further handling of the webbing is analog to the webbing version already described with three sections. In accordance with the invention and depending on the requirements it is also possible to provide further outer parts LA3, LA4, . . . RA3, RA4, . . . (seven sections, nine sections) to tailor the volume of the inflated air bag belt to the individual requirements in each case.

What is claimed is:

1. A method of fabricating an inflatable webbing more particularly for a seat belt, comprising the steps of:
   1.1 weaving a two-ply fabric having an upper ply and a lower ply, comprising
      a) the fabric including at least one left outer part, a middle part, and at least one right outer part, roughly equal in width,
      b) the warp threads of the outer parts are finer than the warp threads of the middle part,
      c) in the narrow creases, each located between the middle part and the adjoining outer parts, opposite the broad middle part the warp threads are finer than the warp threads in the middle part, but coarser tan in the outer parts,
      d) the upper ply and the lower ply are interwoven in the region of the outermost edges of the outer parts,
      e) the upper ply and the lower ply are interwoven at least in the region of the two narrow creases with at least one burst tread running substantially in the warp direction,
   1.2 folding and placing the outermost outer parts on adjoining parts so that all parts are located in sequence above or below the middle part to result in, as viewed in the warp directions the configuration of a collapsed concertina,
   1.3 tucking the middle part to the left so that the upper ply and the lower ply of the middle part formerly facing each other now face outwards and sandwiching the folded outer parts and the middle part in between.

2. The method as set forth in claim 1, in which the two-ply fabric has the following design features:
   a) the fabric webbing width is divided into three parts roughly equal in width, namely a left outer part, a middle part, and a right outer part,
   b) the dtex of the warp threads of the outer parts is that of warp threads as usual for airbags, more particularly, a dtex of approximately a tenth of the dtex of the warp threads of the middle part,
   c) in two narrow creases, each located between the middle part and the adjoining outer parts, the warp threads are finer than the warp threads in the middle part, more particularly, having a dtex roughly half that of the warp threads of the middle part,
   d) the two fabric plies are interwoven in the region of the outermost edges of the outer parts,
   e) the two fabric plies are interwoven at least in the region of the two narrow creases with at least one burst thread running substantially in the warp direction.

3. The method as set forth in claim 1, characterized in that the two fabric plies in the middle portion of the middle part are interwoven with at least two burst threads running in the warp direction.

4. The method as set forth in claim 1, characterized in that the fabric is coated on the outside prior to being folded.

5. A webbing, more particularly for a seat belt, comprising a woven two-ply fabric having an upper ply and a lower ply comprising:
   a) the fabric webbing width is divided into three parts roughly equal in width, namely a left outer part, a middle part, and a right outer part,
   b) the warp threads of the outer parts are substantially finer then the warp threads of the middle part,
   c) in relation to the middle part, narrow creases each located between the middle part and the adjoining outer parts the warp threads are finer than the warp threads in the middle pan, but coarser than in the outer parts,
   d) the upper ply and the lower ply are interwoven in the region of the outer most edges of the outer parts,
   e) the upper ply and lower ply are interwoven at least in the region of the two narrow creases with at least one burst thread running in the warp direction,
   f) the left outer part is folded along the left crease onto the upper ply of the middle part,
   g) the right outer part is folded along the right crease onto the lower ply of the middle part, so that, viewed in the warp directions the configuration of a collapsed concertina materializes,
   h) the middle part is tucked to the left so that the upper ply and the lower ply of the middle part formerly facing each other now face outwards and sandwiched the folding outer parts and the middle part in between.

6. The webbing according to claim 5, wherein the one or both burst threads running in the two narrow creases are woven or stitched.

7. The webbing as set forth in claim 5, characterized in that the fabric is coated on the outside.

8. The webbing as set forth in claim 5, characterized in that the weft thread is made of a monofil and/or multifil.

9. The method as set forth in claim 1 for fabricating a webbing woven to specification, wherein:
   the step "1.1 weaving a two-ply fabric" is implemented such that the two-ply fabric comprises the following further features:
      1.1 f) the fabric is divided into two portions differingly woven in part, namely a retraction portion of the webbing and an inflation portion of the webbing, g) the upper ply and the lower ply of the outer parts of the webbing are interwoven by means of transverse seams in the weft direction along a predetermined strip between the retraction portion and inflation portion, h) the upper ply and the lower ply of the outer parts of the webbing are interwoven by means of longitudinal seams in the warp direction along strips running directly along strips running directly alongside the creases in the retraction portion, prior to the step "1.3 Tucking the middle part" the following step is implemented:

1.31 cutting out the outer parts each divided from the remaining webbing by the woven longitudinal and transverse seam.

10. The method as set forth in claim 1, characterized in that after the step "1.3 Tucking the middle part" of acut-to-length piece of the webbing the following steps are implemented:

1.5 inserting an end portion of a certain length of a single-ply webbing between the upper ply with outer part and lower ply with outer part of the two-ply fabric, 1.6 stitching the sandwiched upper ply of the middle part with outer part, end portion of specific length of single-ply webbing, lower ply of the middle part with outer part by means of one or more seams spaced away from each other sufficiently so that the overlapping portion of the plies remains floppy.

\* \* \* \* \*